US007706399B2

(12) United States Patent
Janczak (10) Patent No.: US 7,706,399 B2
(45) Date of Patent: Apr. 27, 2010

(54) POLLING IN WIRELESS NETWORKS (75) Inventor: Tomasz Janczak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 1500 days.

(21) Appl. No.: 10/742,266

(22) Filed: Dec. 19, 2003

(65) Prior Publication Data
US 2005/0135409 A1 Jun. 23, 2005

(51) Int. Cl.
H04L 12/42 (2006.01)
(52) U.S. Cl. ..................................... 370/449
(58) Field of Classification Search ................ 370/338, 370/348, 349, 350, 386, 447, 449, 476, 503, 370/346, 450, 459, 468; 379/58, 59, 61, 379/63; 455/34.1, 54.1, 56.1, 62, 63
See application file for complete search history.

(56) References Cited

U.S. PATENT DOCUMENTS

| 5,349,632 | A * | 9/1994 | Nagashima | 455/435.3 |
| 5,737,330 | A * | 4/1998 | Fulthorp et al. | 370/346 |
| 6,442,619 | B1 * | 8/2002 | Ouellette | 719/316 |
| 7,058,074 | B2 * | 6/2006 | Ho et al. | 370/447 |
| 7,224,704 | B2 * | 5/2007 | Lu et al. | 370/476 |
| 2002/0071449 | A1 * | 6/2002 | Ho et al. | 370/447 |
| 2002/0089959 | A1 * | 7/2002 | Fischer et al. | 370/338 |
| 2002/0159434 | A1 * | 10/2002 | Gosior et al. | 370/350 |
| 2003/0185241 | A1 * | 10/2003 | Lu et al. | 370/476 |
| 2004/0044784 | A1 | 3/2004 | Hirano | |
| 2006/0056296 | A1 * | 3/2006 | Nandagopalan et al. | 370/230 |
| 2008/0212724 | A1 * | 9/2008 | Grabon et al. | 375/346 |

FOREIGN PATENT DOCUMENTS

| EP | 1367783 A1 | 12/2003 |
| EP | 1429494 A1 | 6/2004 |
| WO | WO-0241590 A1 | 5/2002 |
| WO | WO-02069571 A2 | 9/2002 |
| WO | WO-03024026 A1 | 3/2003 |
| WO | WO-03026215 A1 | 3/2003 |
| WO | WO-2005067215 A1 | 7/2005 |

OTHER PUBLICATIONS

International Seach Report and Written Opinion of the International Searching Authority: Dated Jun. 21, 2005: PCT/US2004/041102, 25 Pages.

Lee, K. C., et al., "Integrated Network of Profibus-DP and IEEE 802.11 Wireless LAN with Hard Real-time Requirement", *Industrial Electronics*, 2001, Proceedings Isie 2001. IEEE International Symposium on Jun. 12, 2001, vol. 3,1484-1489.

(Continued)

Primary Examiner—Kwang B Yao
Assistant Examiner—Tung Q Tran
(74) Attorney, Agent, or Firm—Dana B. Lemoine; Lemoine Patent Services, PLLC (57) ABSTRACT Access points in wireless networks provide contention free access to stations through polling. Polling frames are transmitted to stations at polling intervals. Stations may transmit polling alignment requests to the access point to request a modification of the polling interval. Virtual polling is provided by publishing a virtual polling schedule. Stations respond to the virtual polling schedule without receiving polling frames. Polling intervals used during virtual polling may be modified in response to polling alignment requests from mobile stations.

11 Claims, 11 Drawing Sheets

OTHER PUBLICATIONS

Invitation to Pay Additional Fees with Partial Search Report, Dated Apr. 12, 2005, PCT/US2004/041102, 6 Pages.

Chen, D., et al., "Supporting VoIP Traffic in IEEE 802.11 WLAN with Enhanced Medium Access Control (MAC) for Quality of Service", *Avaya Technical Reports ALR-2002-025*, Avaya Labs Research-Center for Advanced Computing and Communications (CACC), http://www.research.avayalabs.com/techreportY.html,(Aug. 1, 2002),1-7.

Jose, B., "Contention Free TXOP Request and Allocation Issues", *IEEE* 802.11-02/248RO, (Mar. 14, 2002), 1-27.

Mangold, S., et al., "IEEE 802.11e Wireless LAN for Quality of Service", *Comnets Aachen Univ. of Technology—Phillips Research*, (Feb. 2002), 1-8.

Shankar, S., et al., "TXOP Request: in time vs. in Queue Size?", Philips Research USA. *IEEE* 802.11-02-314RO, http://grouper.ieee.org/groups/802/11/documents/D2T301-350.html,(May 15, 2002),1-12.

Velayutham, A., et al., "An Enhanced Alternative to the IEEE 802.11e MAC Scheme", *Department of Computer Science—Iowa State University*, (Mar. 2, 2003),1-5.

Zee, V. D. M., "Quality of Service in Bluetooth Networking Part I", http://www.ub.utwente.nl/webdocs/ctit/1/0000004a.pdf;XP002233486, Dated Jan. 3, 2001, pp. 1-56.

"Bluetooth Specification version 1.0 b,Core, Link Manger Protocol", Dated Dec. 1, 1999, pp. 192-1082.

\* cited by examiner

| BITS 0-3 | BIT 4 | BIT 5 | BITS 6-7 | BITS 8-15 |
|---|---|---|---|---|
| TID | RESERVED | ACK POLICY | RESERVED | POLLING ALIGNMENT |

POLLING IN WIRELESS NETWORKS

FIELD

The present invention relates generally to computer networks, and more specifically to wireless networks.

BACKGROUND

Wireless networks typically include mobile stations and access points. An access point may enable contention-free communications by polling mobile stations.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
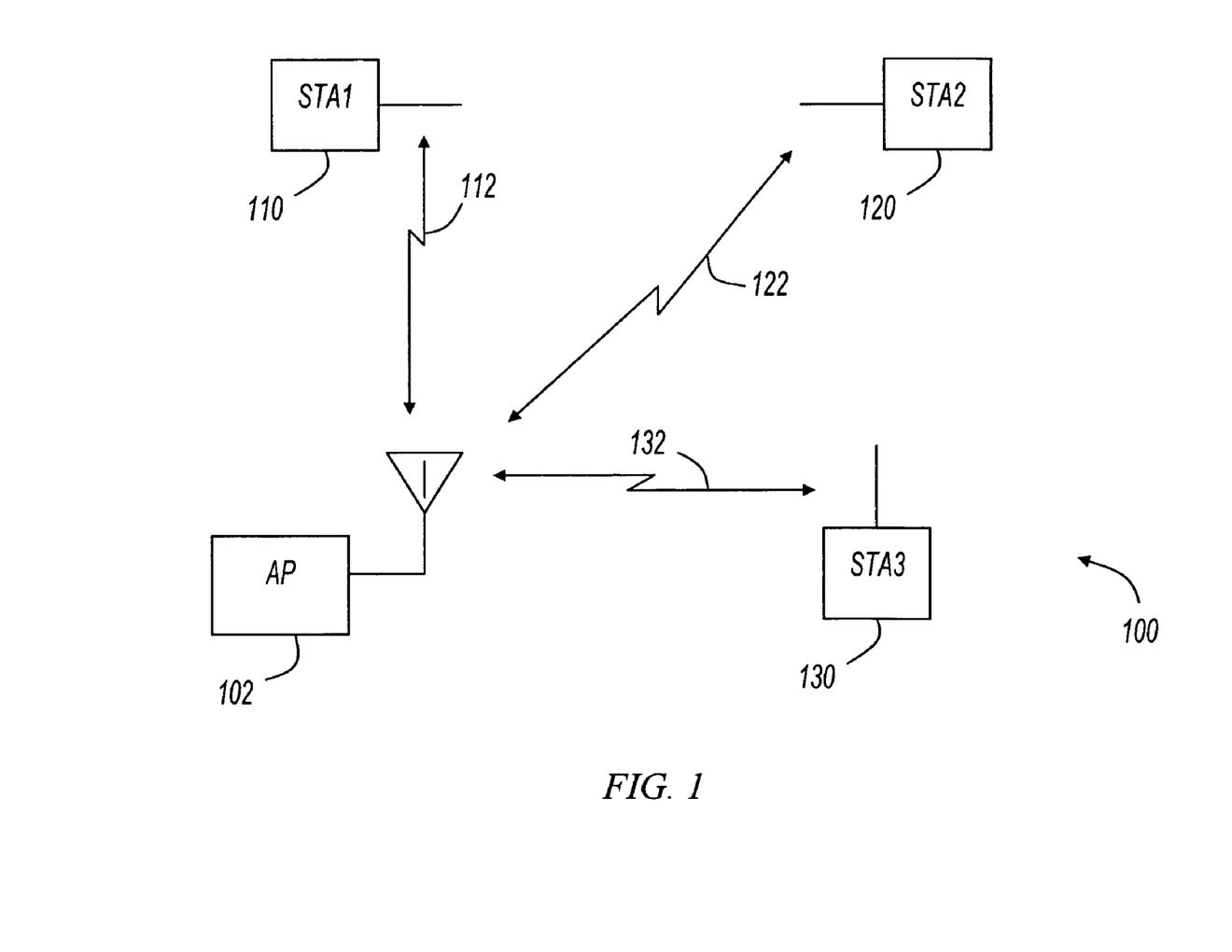
FIG. 1 shows a diagram of a wireless network.

FIG. 1 shows a diagram of a wireless network. Wireless network 100 includes access point (AP) 102 and mobile stations (STA) 110, 120, and 130. In some embodiments, wireless network 100 is a wireless local area network (WLAN). For example, one or more of mobile stations 110, 120, and 130, or access point 102 may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition.

As explained below, in some embodiments, mobile stations 110, 120, and 130 operate in compliance with an 802.11 standard, and access point 102 is capable of maintaining 802.11 compliant communications with multiple mobile stations. Mobile stations 110, 120, and 130 may be any type of mobile station capable of communicating in network 100. For example, the mobile stations may be computers, personal digital assistants, wireless-capable cellular phones, home audio or video appliances, or the like.

Access point 102 communicates with mobile station 110 (also referred to as "STA1") using signal 112. Access point 102 communicates with mobile station 120 (also referred to as "STA2") using signal 122, and access point 102 communicates with mobile station 130 (also referred to as "STA3") using signal 132. In some embodiments, signals 112, 122, and 132 are transmitted through a shared medium. For example, in some embodiments, the shared medium is the wireless channel in free space between the access point and the various mobile stations. Although AP 102 and mobile stations 110, 120, and 130 are shown communicating using a wireless shared medium in FIG. 1, this is not a limitation of the present invention. For example, in some embodiments, the shared medium may include one or more wires.

In some embodiments, the various access points and mobile stations contend for the shared medium using a collision sense multiple access with collision avoidance (CSMA/CA) random access scheme. For example, a distributed coordination function (DCF) or enhanced distributed coordination function (EDCF) may be implemented in AP 102, and may also be implemented in mobile stations 110, 120, and 130 to provide a mechanism for the various elements shown in FIG. 1 to contend for the shared medium. In some embodiments, a DCF or EDCF may be implemented that is in compliance with an IEEE 802.11 standard, and in other embodiments, a DCF or EDCF may be implemented that is partially compliant with an IEEE 802.11 standard.

In some embodiments, the various access points and mobile stations use a contention-free access scheme to access the shared medium. For example, a point coordination function (PCF) or hybrid coordination function (HCF) may be implemented in AP 102 to provide for contention-free communications with one or more of mobile stations 110, 120, and 130. In some embodiments, a PCF or HCF may be implemented that is in compliance with and IEEE 802.11 standard, and in other embodiments, a PCF or HCF may be implemented that is partially compliant with an IEEE 802.11 standard.

In some embodiments, the various access points and mobile stations communicate using a hybrid coordination function (HCF) that provides quality of service (QoS) guarantees. In some embodiments, channel access schemes with QoS guarantees may be suitable for delay-sensitive or jitter-sensitive services, such as voice, video conferencing, or the like. These services may be characterized by constant or semi-constant intervals between subsequent packets, as well as low delay/jitter requirements.

Figure 2:
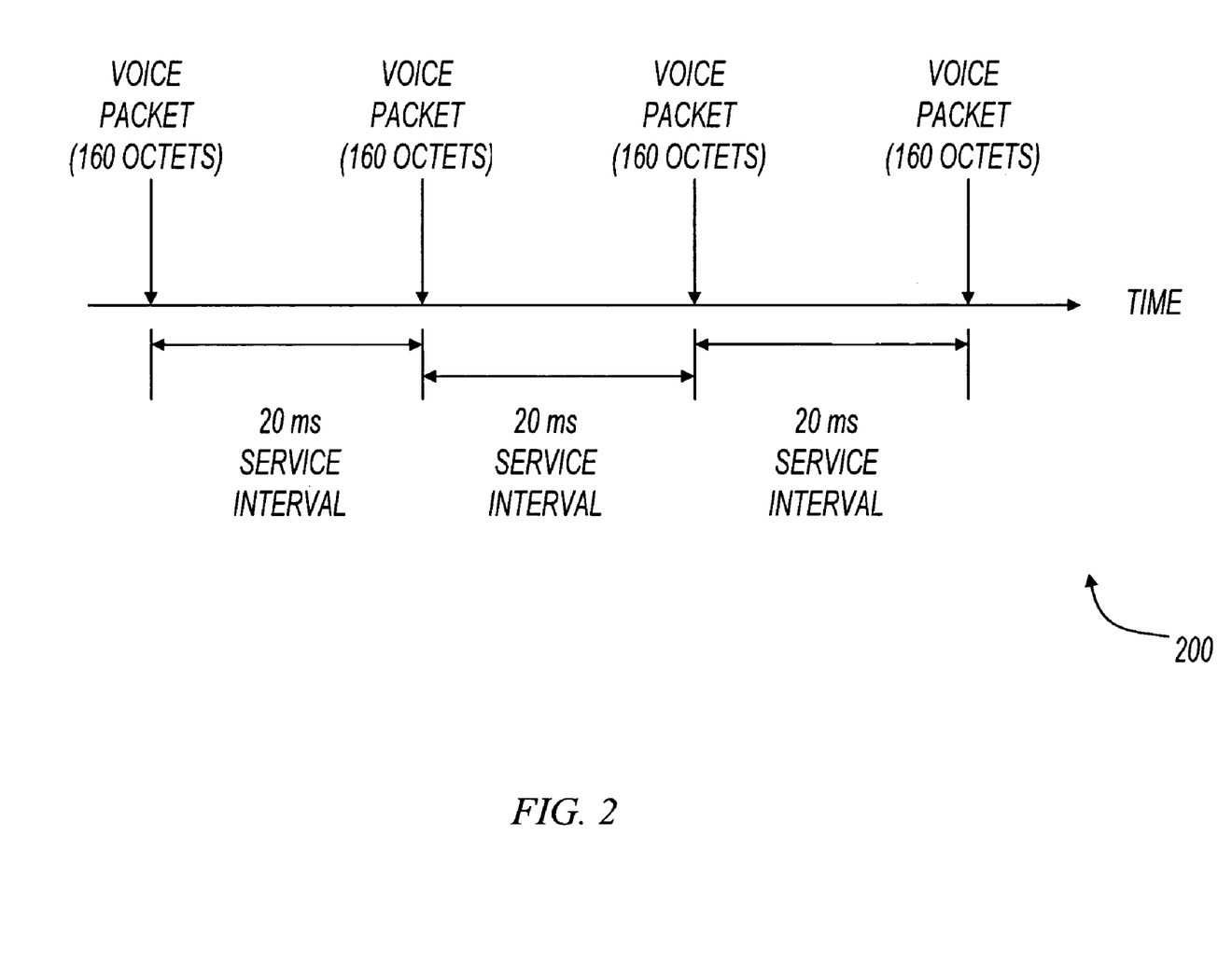
FIG. 2 shows an example voice traffic model.

FIG. 2 shows an example voice traffic model. Voice traffic model 200 shows voice packets of 160 octets each with a 20 millisecond (ms) service interval. In some embodiments, this corresponds to a mobile station sending data from a 64 kilobits per second (kbps) codec. In operation, a mobile station with voice traffic corresponding to traffic model 200 may explicitly request polling-based access from an access point with HCF, and may inform the access point about the service interval of 20 ms. In some embodiments, the mobile station may provide a maximum and minimum acceptable service interval to the access point when requesting polling-based services.

Based on the service request made by the mobile station, the access point may select a "polling interval." The polling interval is the time interval between the transmission of contention-free polling (CF-Poll) frames by the access point. In response to the CF-Poll frames, the mobile station may transmit data frames. In the example of FIG. 2, the access point may select a polling interval of 20 ms, and CF-Poll frames may be transmitted every 20 ms. In response to the CF-Poll frames, the mobile station may respond by transmitting 160 octets of voice data.

To ensure low jitter, it is enough that an access point selects the polling interval equal to the inter-packet arrival time in a traffic source. For example, in traffic model 200, packets may be originated by a codec at a mobile station every 20 ms. If an access point selects a polling interval equal to 20 ms, the voice traffic represented by voice traffic model 200 may be serviced with low jitter. To ensure low delay, however, the polling frames should be sent just after the packet has been originated. In some embodiments, depending on the timing of the polling frames, excessive buffering delay may occur in a mobile station, causing increased delay, and proving troublesome for QoS guarantees.

In some embodiments, the buffering delay may be reduced through dynamic modification of the polling interval. In these embodiments, the "polling interval" may be modified by the AP based on a polling alignment request sent by a mobile station. For example, mobile station 110 (FIG. 1) may have voice traffic corresponding to traffic model 200 (FIG. 2) to send through AP 102, and may request polling-based access to the shared medium with a particular QoS guarantee. Access point AP 102 may set a polling interval that defines an interval in time between polling frames sent to mobile station 110. If voice traffic backs up at mobile station 110, it may request that the polling interval be reduced. Likewise, under certain conditions, mobile station 110 may request that the polling interval be increased. In some embodiments, the polling alignment request may apply to the next polling interval only, and in other embodiments, the polling alignment request may apply to all subsequent polling intervals.

Figure 3:
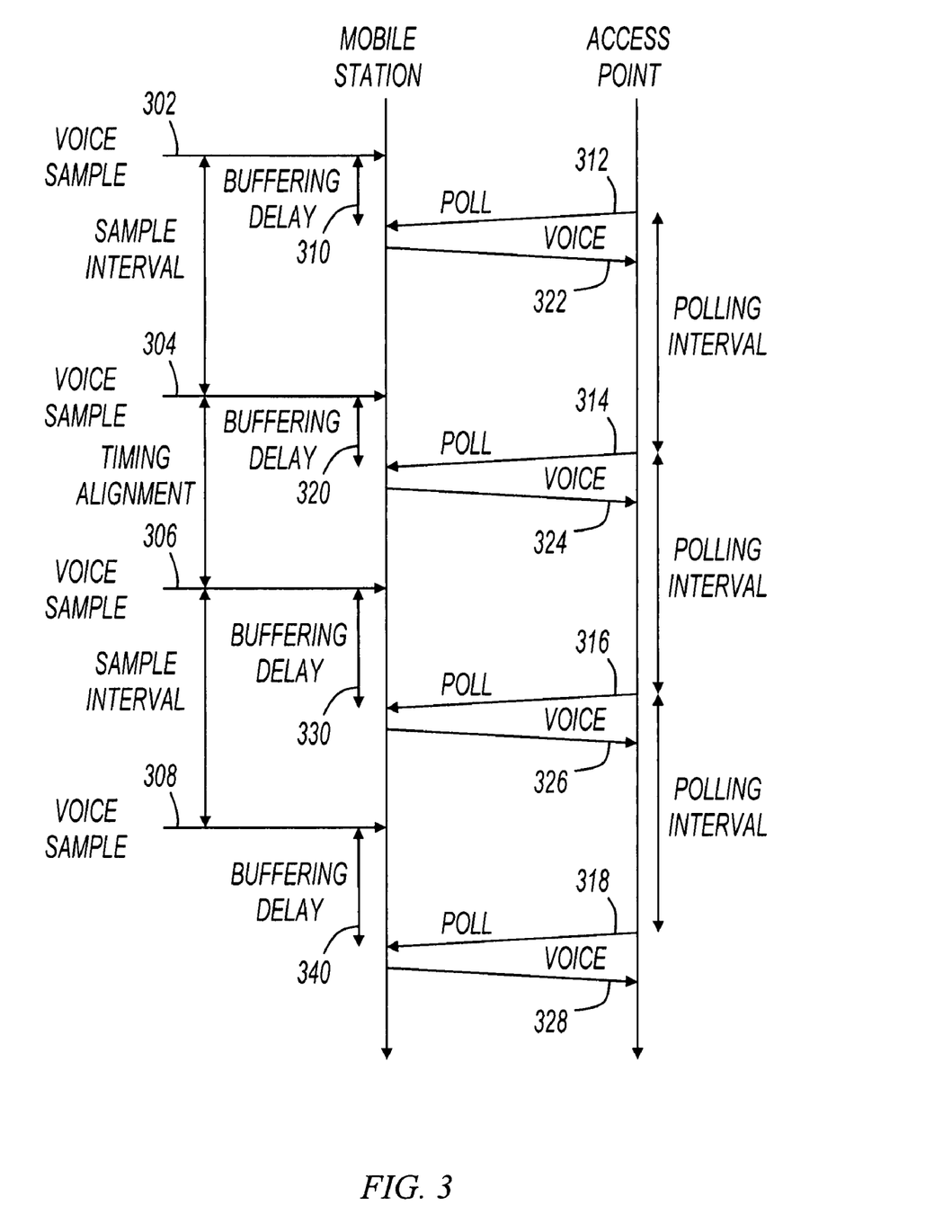
FIG. 3 shows polling without alignment.
Figure 4:
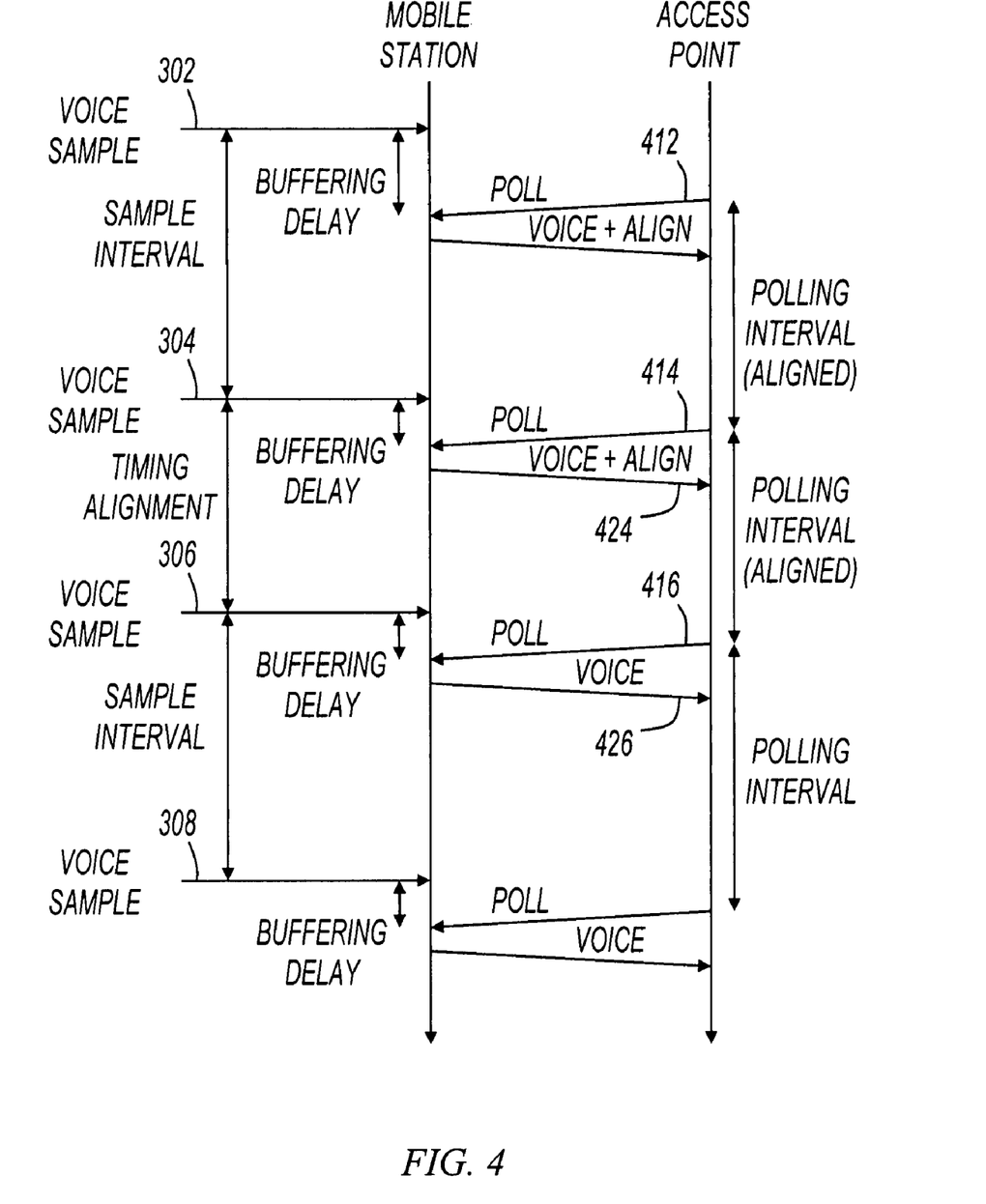
FIG. 4 shows polling with alignment.

FIG. 3 shows polling without alignment, and FIG. 4 shows polling with alignment. In some embodiments, a voice sample is generated at a mobile station at each of 302, 304, 306, and 308, and polling frames 312, 314, 316, and 318 are generated separated by a constant polling interval. In response to the polling frames, the mobile station provides voice data frames 322, 324, 326, and 328. The time between a voice sample arriving at 302 and voice data frame 322 being transmitted results in buffering delay 310 at the mobile station. Likewise, buffering delays 320, 330, and 340 represent differences between voice samples being generated and voice data being transmitted in response to a polling frame.

The amount of buffering at a mobile station may be influenced by many factors. For example, an initial misalignment between the generation of voice data and polling frames may cause buffering at a source station. When a voice stream is established, an access point may not synchronize a time offset between the generation of polling frames and the generation of voice packets in a source station. Larger time offsets may cause larger amounts of buffering. Also for example, a voice codec timing alignment change may affect buffering. Regardless of any initial alignment between a codec and polling frames, the time offset may change during a voice call. For example, the time offset may change if a voice call is terminated in a Universal Mobile Telephone Service (UMTS) network, in part because the UMTS network may request the voice stream originator to advance or delay the codec offset.

In the example of FIGS. 3 and 4, the sample interval between voice samples 304 and 306 is shorter than the others. This change in sample interval may have many causes; for example, the change in sample interval may be the result of a change in the time offset as described in the previous paragraph. The change in the sample interval results in a larger buffering delay. For example, as shown in FIG. 3, the amount of buffering delay increases between buffering delay 320 and 330.

FIG. 4 shows the voice sample generated at the mobile station at each of 302, 304, 306, and 308, which is the same at that shown in FIG. 3. The timing of the first polling frame 412 is also the same as that shown in FIG. 3. In response to polling frame 412, the mobile station sends back voice data (as in FIG. 3), and also includes a polling alignment request. In some embodiments, the access point may respond to the polling alignment request by increasing or decreasing the polling interval. In the example of FIG. 4, the polling interval is decreased, and the next polling frame 414 is sent earlier than if the polling alignment request had not been sent.

In the example of FIG. 4, a second polling alignment request is sent with data frame 424, and the next polling frame is sent after a second modified polling interval. In response to the next polling frame at 416, voice data is sent without a polling alignment request at 426, and the polling interval returns to the polling interval value first set by the access point. As shown in FIG. 4, the amount of buffering delay may be reduced by realigning polling frames in response to polling alignment requests.

In the example of FIG. 4, each polling alignment request modifies the next polling interval. In some embodiments, a polling alignment request may modify a polling interval other than the next polling interval. For example, an access point may modify a polling interval two or more polling intervals in the future. Further, in some embodiments, more than one polling interval may be modified in response to a polling alignment request.

Figure 5:
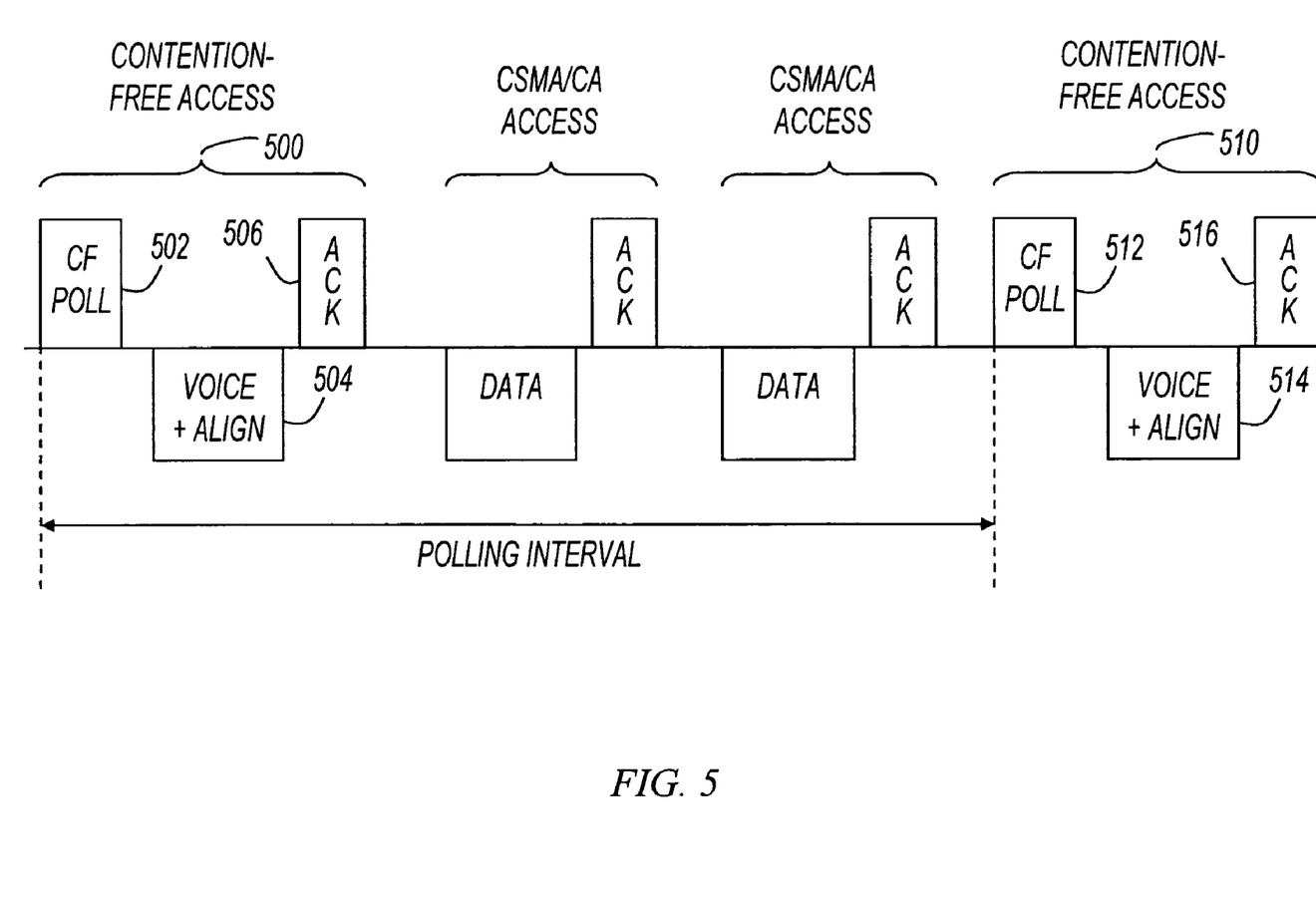
FIG. 5 shows a combination of CSMA/CA and contention-free access to a shared medium.

FIG. 5 shows a combination of CSMA/CA and contention-free access to a shared medium. A first contention-free access is shown at 500, where an access point sends polling frame 502, a station responds with voice data and polling alignment request 504, and the access point replies with acknowledgment frame 506. A second contention-free access is shown at 510, where the access point sends polling frame 512, the station responds with voice data and polling alignment request 514, and the access point replies with acknowledgment frame 516. In some embodiments, the time between polling frames 502 and 512 may be modified by the access point in response to the polling alignment request included in frame 504. For example, the polling alignment request in frame 504 may request that the next polling interval be reduced in response to buffering delay in the station.

In some embodiments, the contention-free access shown in FIG. 5 may be in compliance with an IEEE 802.11 standard, and in other embodiments, the contention-free access shown in FIG. 5 may be in partial compliance with an IEEE 802.11 standard. For example, the contention-free access may be performed in compliance with a point control function (PCF) or hybrid control function (HCF), but this is not a limitation of the present invention.

Figure 6:
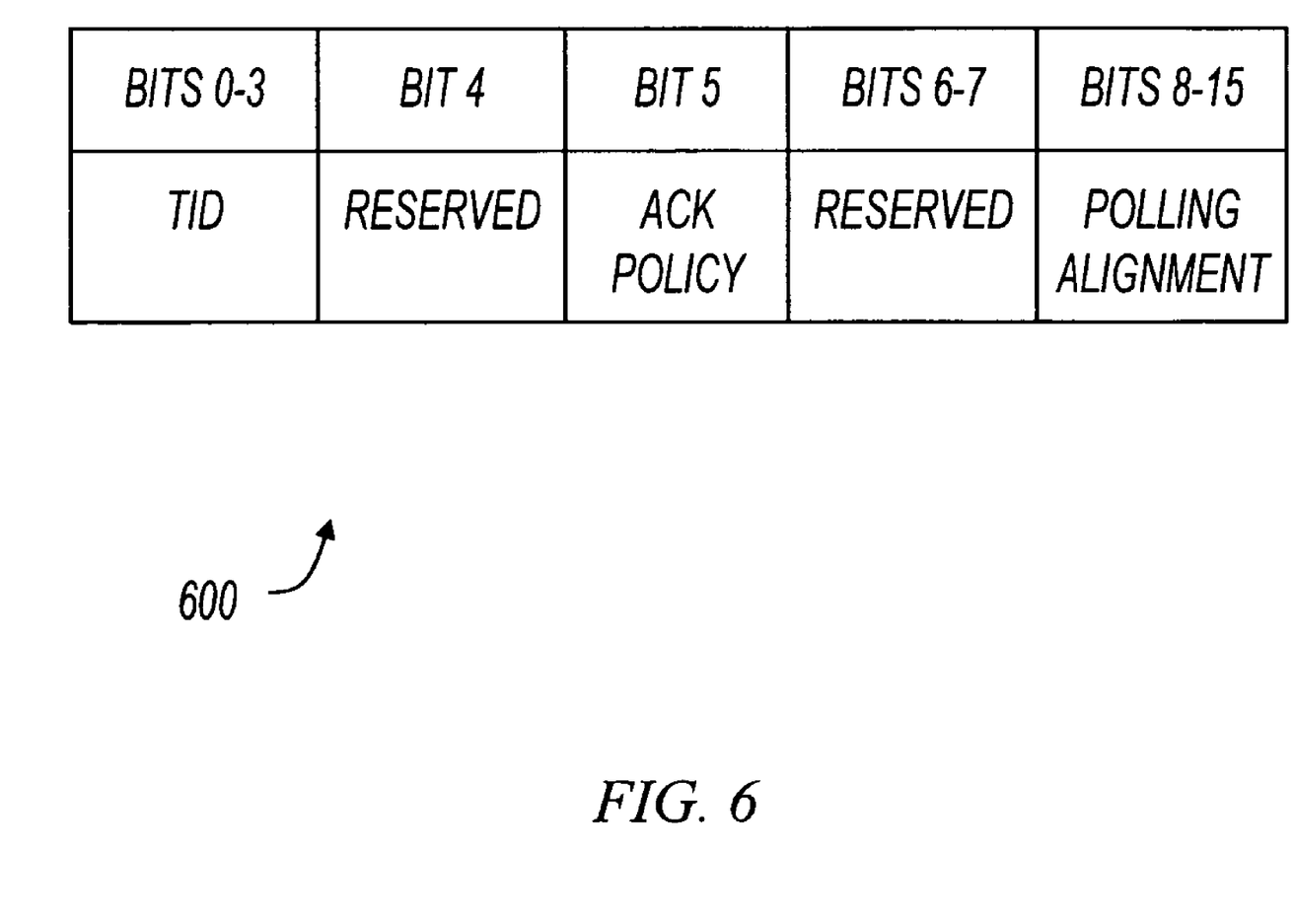
FIG. 6 shows a quality of service field in accordance with various embodiments of the present invention.

FIG. 6 shows a quality of service field in accordance with various embodiments of the present invention. Quality of service (QoS) field 600 may be included in any type of frame, including but not limited to QoS data frames and QoS Data+ CF+Ack frames. Bits 8-15 of QoS field 600 include polling alignment information. In some embodiments, the polling alignment information is represented as a signed value in units of 32 microseconds. In these embodiments, a station may request that a polling interval be increased or decreased in units of 32 microseconds. In other embodiments, polling alignment information is represented in a different manner. For example, the polling alignment information may include a request to increase or decrease more than one polling interval. Further, the polling alignment information may request that a polling interval other than the next polling interval be modified.

In some embodiments, polling alignment requests may be implemented in fields other than a QoS field as shown in FIG. 6. For example, bits other than bits 8-15 may be used to hold polling alignment information. Also for example, fields other than a QoS field may be used to hold polling alignment information. In general, a polling alignment request may be made in any manner without departing from the scope of the present invention.

Figure 7:
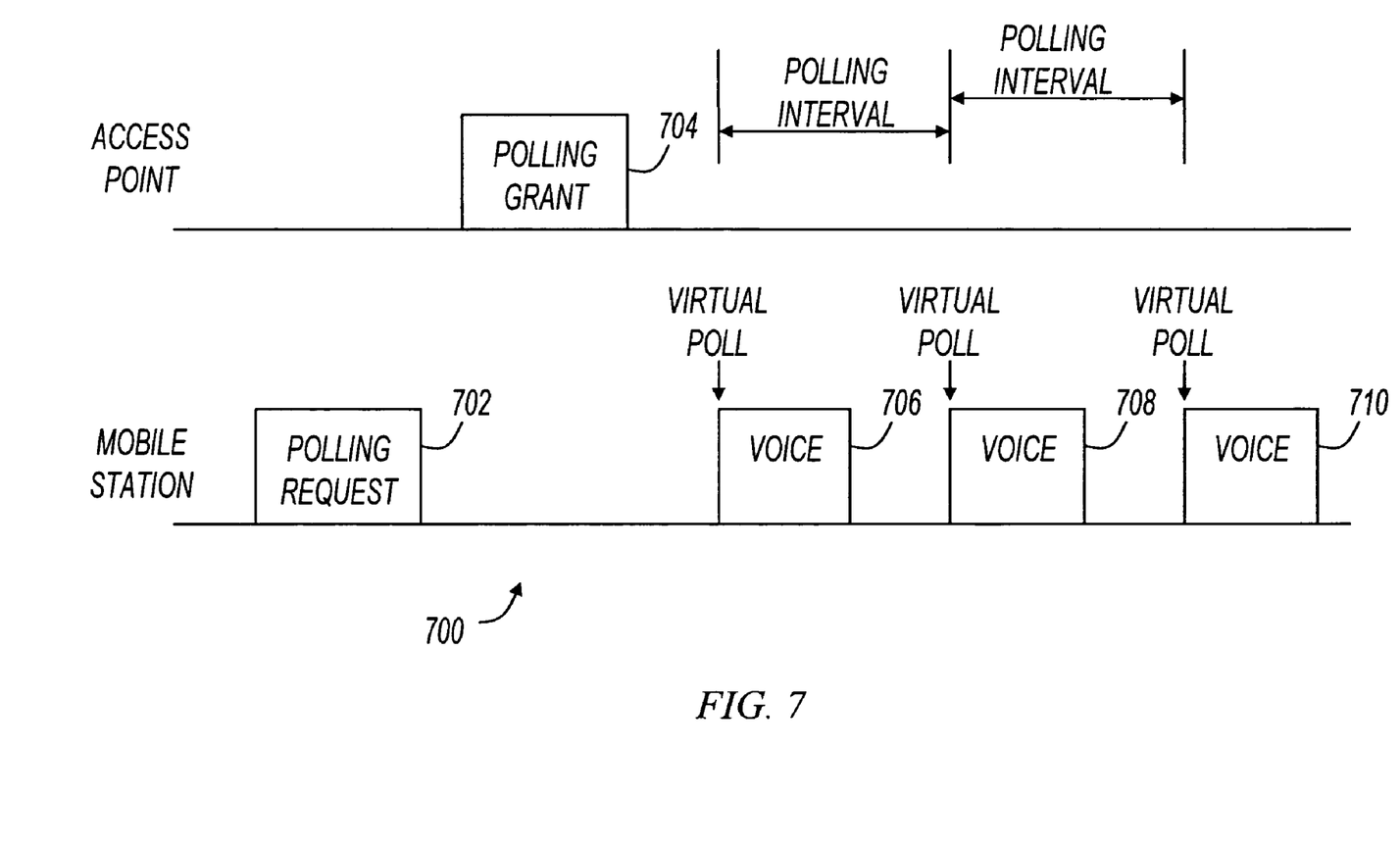
FIG. 7 shows a virtual polling sequence.

FIG. 7 shows a virtual polling sequence. Virtual polling sequence 700 includes polling request 702, polling grant 704, and voice data 706, 708, and 710. Polling request 702 is transmitted by the mobile station to request contention-free access. In some embodiments, the polling request may include QoS information to request a QoS guarantee, and in other embodiments, the polling request does not include QoS information. In response to polling request 702, the access point transmits polling grant 704, and includes information relating to the polling interval and an initial polling offset corresponding to an initial poll time. The mobile station may calculate its polling schedule from the initial poll time and the polling interval.

In some embodiments, a polling grant by an access point delegates an access privilege to the shared medium that is normally reserved for polling by the access point. For example, in some embodiments, a priority interframe space (PIFS) transmission privilege may be granted to a mobile terminal. In these embodiments, after receiving a polling grant, a mobile station may use a PIFS interval to commence a transmission, whereas without a polling grant, a mobile station may use a distributed interframe space (DIFS), which is longer than a PIFS. When virtual polling is not used, the access point retains the privilege of using the PIFS, and when virtual polling is granted, the access point delegates that privilege to one or more mobile stations.

The mobile station transmits data at the appropriate times based on the polling schedule. On boundaries between successive polling intervals, a "virtual poll event" occurs in part because the polling is performed without sending polling frames. In some embodiments, the virtual poll event has the same effect as a CP-Poll frame would have, had it been sent. This decouples the admission control procedure (choice of polling schedule) from the data traffic procedures (actual data exchange). If an access point changes the polling schedule, it may send a new polling grant with updated schedules.

In some embodiments, a station that supports virtual polling may keep track of the polling schedules granted to other stations. For example, a station may keep track of other polling schedules by listening and recording polling grants issued to other stations. In some embodiments, an access point may broadcast all active schedules in beacon frames to enable power-saving options in stations. Knowledge of other polling schedules may help to avoid collisions when poll events occur in two or more stations during an ongoing transmission.

In some embodiments, polling intervals in a virtual polling environment may be modified by a polling alignment request. For example, the mobile station may include a polling alignment request with voice data 706 to modify the polling interval between voice data 706 and 708. The mobile station may then transmit voice data at 708 according to the modified polling interval. In some embodiments, if the access point does not accept the polling alignment request, the access point may transmit another polling grant to set the polling interval.

Figure 8:
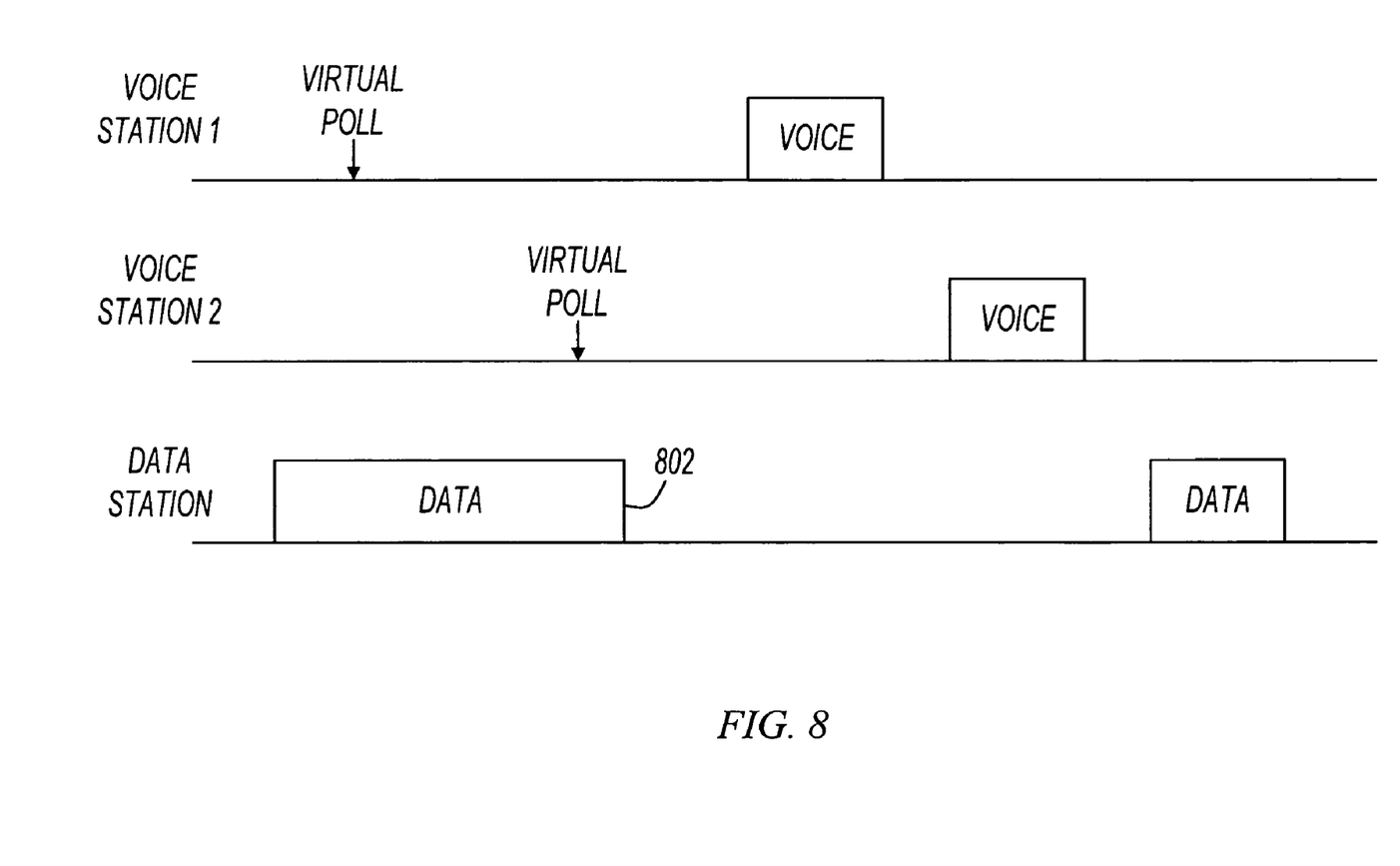
FIG. 8 shows virtual polling collision resolution.

FIG. 8 shows virtual polling collision resolution. As shown in FIG. 8, a data station is transmitting data 802 during the virtual polling time of both voice station 1 and voice station 2. In IEEE 802.11 systems without virtual polling, CP-Poll frames are sent after PIFS and only an access point may use the PIFS interval. In virtual polling embodiments of the present invention, a privilege to use PIFS is delegated by an access point to selected stations by the polling grant. Then, the selected mobile station(s) are allowed to use PIFS after a "virtual poll" event occurs. In FIG. 8, "virtual polls" for both station 1 and station 2 occur during a foreign transmission. If both voice station 1 and voice station 2 were to use PIFS, a collision would occur. In various embodiments of the present invention, station 2 defers by not making use of its PIFS privilege, because it knows that there is an earlier "virtual poll" pending (station 1 in this example).

Figure 9:
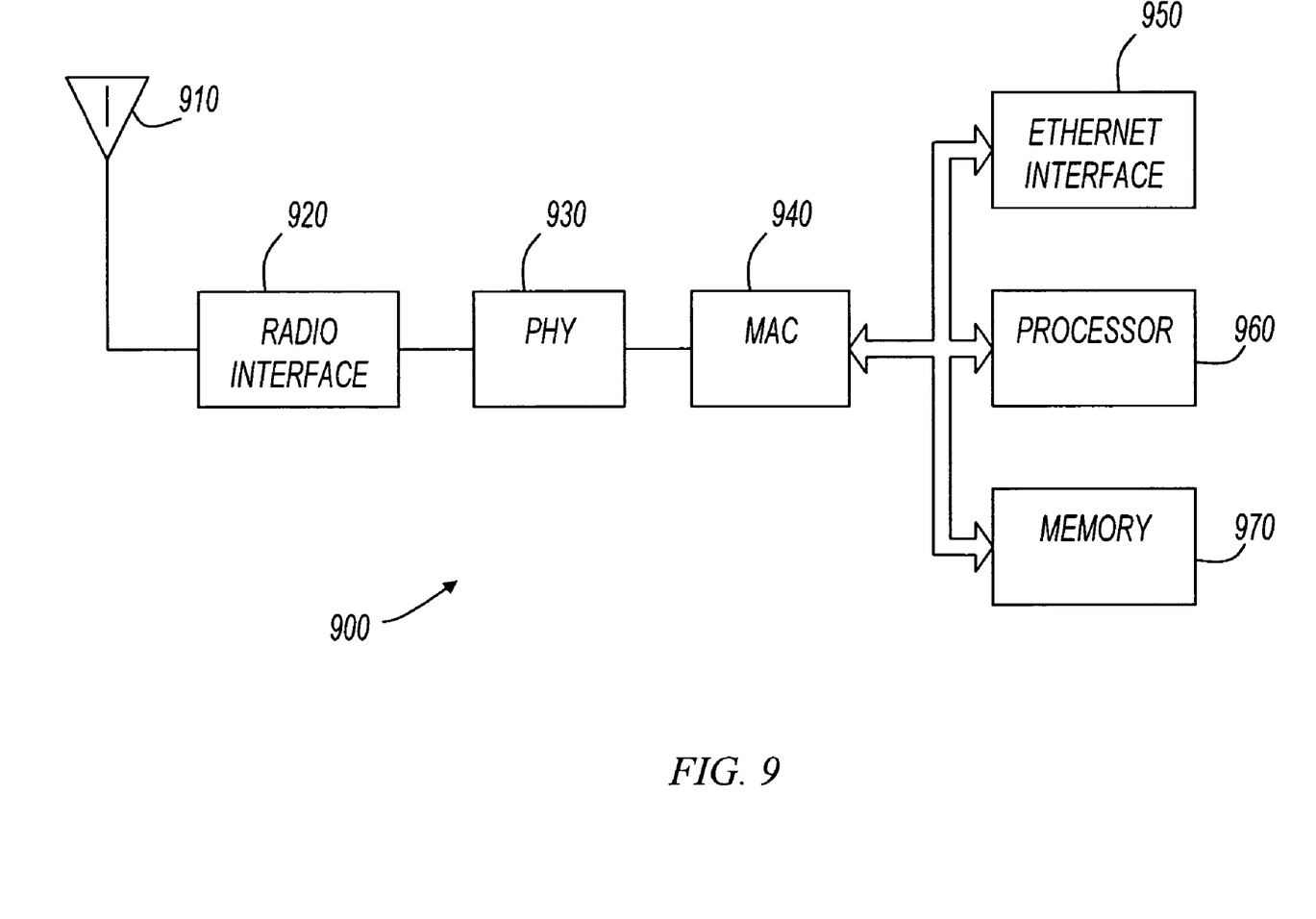
FIG. 9 shows a system diagram in accordance with various embodiments of the present invention.

FIG. 9 shows a system diagram in accordance with various embodiments of the present invention. Electronic system 900 includes antenna 910, radio interface 920, physical layer (PHY) 930, media access control (MAC) mechanism 940, Ethernet interface 950, processor 960, and memory 970. In some embodiments, electronic system 900 may be an access point that can modify polling intervals in response to polling alignment requests. In other embodiments, electronic system 900 may be a mobile station that can request contention-free access through polling or virtual polling. Further, in some embodiments, electronic system 900 may be a mobile station that can provide a polling alignment request to an access point. For example, electronic system 900 may be utilized in network 100 as access point 102, or as one of mobile stations 110, 120, or 130. Also for example, electronic system 900 may be an access point or mobile station capable of communicating using frame sequences shown in the previous figures.

In some embodiments, electronic system 900 may represent a system that includes an access point or mobile station as well as other circuits. For example, in some embodiments, electronic system 900 may be a computer, such as a personal computer, a workstation, or the like, that includes a wireless network interface as a peripheral or as an integrated unit. Further, electronic system 900 may include a series of access points that are coupled together in a network.

In operation, system 900 sends and receives signals using antenna 910, and the signals are processed by the various elements shown in FIG. 9. Radio interface 920 is coupled to antenna 910 to interact with a wireless network. Radio interface 920 may include circuitry to support the transmission and reception of radio frequency (RF) signals. For example, in some embodiments, radio interface 920 includes an RF receiver to receive signals and perform "front end" processing such as low noise amplification (LNA), filtering, frequency conversion or the like. Also for example, in some embodiments, radio interface 920 may include circuits to support frequency up-conversion, and an RF transmitter. The invention is not limited by the contents or function of radio interface 920.

Physical layer (PHY) 930 may be any suitable physical layer implementation. For example, PHY 930 may be a circuit block that implements a physical layer that complies with an IEEE 802.11 standard or other standard. Examples include, but are not limited to, direct sequence spread spectrum (DSSS), frequency hopping spread spectrum (FHSS), and orthogonal frequency division multiplexing (OFDM). In some embodiments, PHY 930 and radio interface 920 are combined into a single PHY or a single radio interface.

Media access control (MAC) mechanism 940 may be any suitable media access control layer implementation. For example, MAC 940 may be implemented in software, or hardware or any combination thereof. In some embodiments, a portion of MAC 940 may be implemented in hardware, and a portion may be implemented in software that is executed by processor 960. Further, MAC 940 may include a processor separate from processor 960. MAC 940 may implement any of the polling embodiments of the present invention. For example, MAC 940 may provide frames to request or grant contention-free access to a shared medium. Also for example, MAC 940 may provide data frames that include polling alignment requests.

Figure 11:
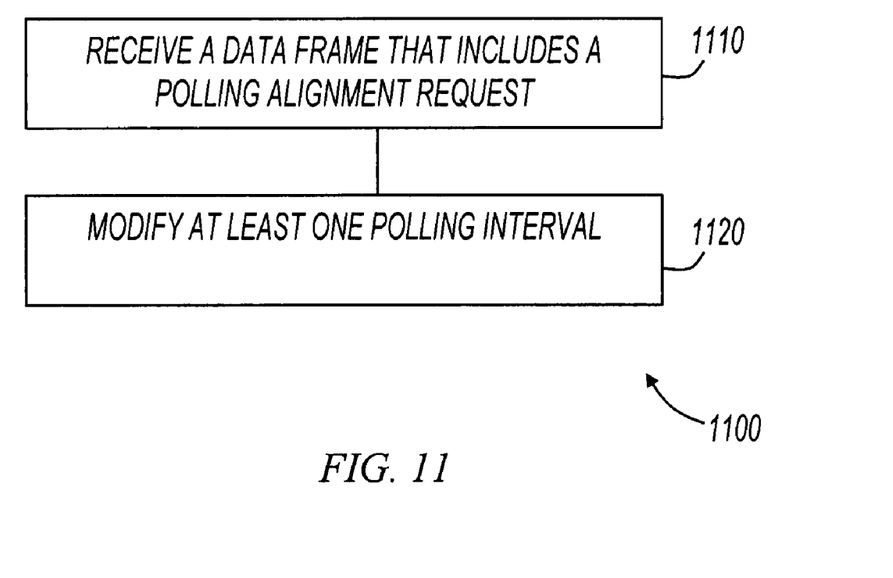
Figure 12:
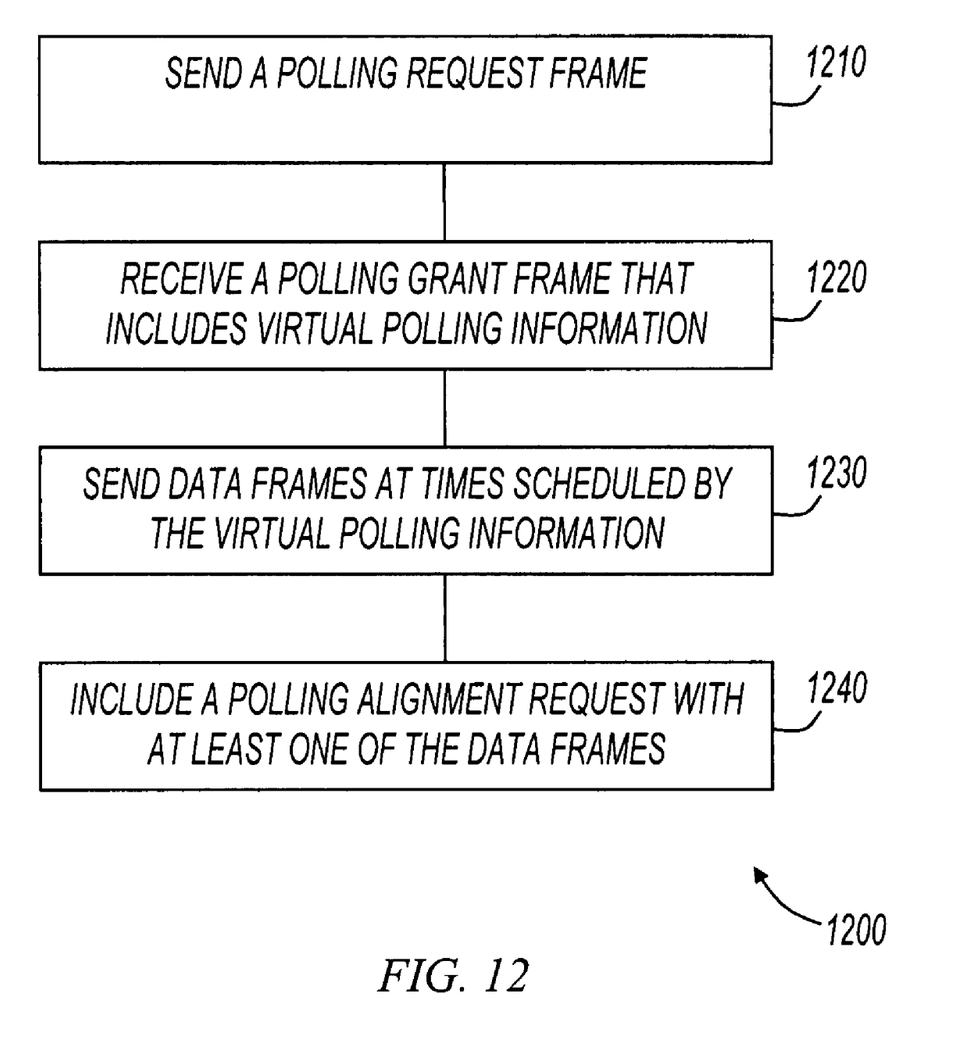

Processor 960 may perform method embodiments of the present invention, such as method 1000 (FIG. 10), method 1100 (FIG. 11), or method 1200 (FIG. 12). Processor 960 represents any type of processor, including but not limited to, a microprocessor, a digital signal processor, a microcontroller, or the like.

Memory 970 represents an article that includes a machine readable medium. For example, memory 970 represents a random access memory (RAM), dynamic random access memory (DRAM), static random access memory (SRAM), read only memory (ROM), flash memory, or any other type of article that includes a medium readable by processor 960. Memory 970 may store instructions for performing the execution of the various method embodiments of the present invention.

Ethernet interface 950 may provide communications between electronic system 900 and other systems. For example, in some embodiments, electronic system 900 may be an access point that utilizes Ethernet interface 950 to communicate with a wired network or to communicate with other access points. Some embodiments of the present invention do not include Ethernet interface 950. For example, in some embodiments, electronic system 900 may be a network interface card (NIC) that communicates with a computer or network using a bus or other type of port.

Figure 10:
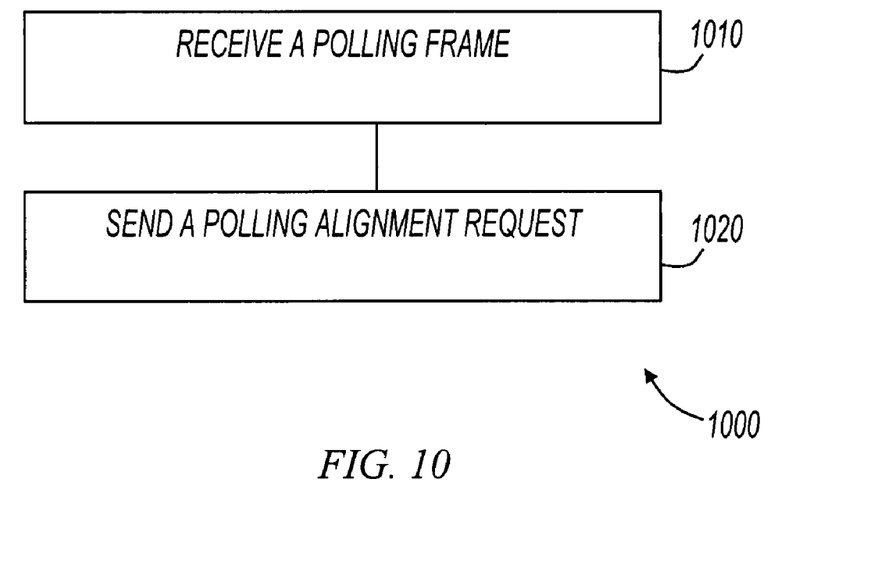
FIGS. 10-12 show flowcharts in accordance with various embodiments of the present invention.

FIG. 10 shows a flowchart in accordance with various embodiments of the present invention. In some embodiments, method 1000 may be used to align a polling interval in a wireless network. In some embodiments, method 1000, or portions thereof, is performed by a mobile station, a processor, or an electronic system, embodiments of which are shown in the various figures. Method 1000 is not limited by the particular type of apparatus, software element, or system performing the method. The various actions in method 1000 may be performed in the order presented, or may be performed in a different order. Further, in some embodiments, some actions listed in FIG. 10 are omitted from method 1000.

Method 1000 is shown beginning at block 1010 in which a polling frame is received. In some embodiments, the polling frame may be compatible with an IEEE 802.11 standard. For example, the polling frame may be a CF-Poll frame controlled by a point coordination function (PCF) or by a hybrid coordination function (HCF) implemented in an IEEE 802.11 compliant access point.

At 1020, a polling alignment request is sent. In some embodiments, the polling alignment request is included in a data frame, and in other embodiments, the polling alignment request is included in an acknowledgement frame. The polling alignment request may include a request to decrease the polling interval or increase the polling interval. In some embodiments, the polling alignment request is included in bits 8-15 of a quality of service (QoS) field. For example, the polling alignment request may be provided in the manner shown in FIG. 6.

In some embodiments, each response to a polling frame includes a polling alignment request. In other embodiments, not all responses to a polling frame include a polling alignment request. For example, in some embodiments, after a first polling frame is received and a polling alignment request is sent, a second polling frame may be received and a response frame that does not include a polling alignment requested may be sent.

In some embodiments, the polling alignment request may be used to reduce a buffering delay in a source station. For example, in some embodiments, a source station may provide voice data that is buffered. The buffering delay of the voice data may be monitored and a polling alignment request may be formed in response to the buffering delay.

FIG. 11 shows a flowchart in accordance with various embodiments of the present invention. In some embodiments, method 1100 may be used to align a polling interval in a wireless network. In some embodiments, method 1100, or portions thereof, is performed by an access point, a processor, or an electronic system, embodiments of which are shown in the various figures. Method 1100 is not limited by the particular type of apparatus, software element, or system performing the method. The various actions in method 1100 may be performed in the order presented, or may be performed in a different order. Further, in some embodiments, some actions listed in FIG. 11 are omitted from method 1100.

Method 1100 is shown beginning at block 1110 in which a data frame that includes a polling alignment request is received. In some embodiments, the data frame may be compatible with an IEEE 802.11 standard, but this is not a limitation of the present invention. For example, the data frame received may be of many different types, including, but not limited to, a quality of service (QoS) data frame, or a QoS plus contention-free acknowledgement (QoS Data+CF Ack) frame.

At 1120, at least one polling interval is modified. For example, in some embodiments, a polling interval is decreased in response to the polling alignment request. Also for example, in some embodiments, the polling interval is increased in response to the polling alignment request. In some embodiments, one polling interval is modified in response to the polling alignment request, and in other embodiments, more than one polling interval is modified in response to the polling alignment request. In still further embodiments, one or more polling intervals other than the next polling interval is modified in response to the polling alignment request.

FIG. 12 shows a flowchart in accordance with various embodiments of the present invention. In some embodiments, method 1200 may be used to provide virtual polling in a wireless network. In some embodiments, method 1200, or portions thereof, is performed by a mobile station, a processor, or an electronic system, embodiments of which are shown in the various figures. Method 1200 is not limited by the particular type of apparatus, software element, or system performing the method. The various actions in method 1200 may be performed in the order presented, or may be performed in a different order. Further, in some embodiments, some actions listed in FIG. 12 are omitted from method 1200.

Method 1200 is shown beginning at block 1210 in which a polling request frame is sent. In some embodiments, this corresponds to a mobile station requesting contention-free access to a shared medium. In some embodiments, the polling frame may be compatible with an IEEE 802.11 standard, but this is not a limitation of the present invention. The polling request frame may include quality of service (QoS) information relating to a streaming applications such as voice, teleconferencing, or the like. At 1220, a polling grant frame including virtual polling information is received. The polling grant frame may include information describing a polling interval. For example, referring now back to FIG. 7, polling grant 704 may include information describing the polling interval shown.

At 1230, data frames are sent at times scheduled by the virtual polling information. In some embodiments, the data frames are sent without first receiving polling frames. For example, data frames may be sent using contention-free access privileges granted by an access point. In some embodiments, the contention-free access privileges may correspond to times otherwise reserved for polling frames (e.g., PIFS in IEEE 802.11). At 1240, a polling alignment request is included in it at least one of the data frames. The polling alignment request may be used to request a decrease or an increase in the polling interval. In some embodiments, the polling alignment request requests a change in the next polling interval, and unless an access point responds with another polling grant, data frames are sent at the time corresponding to a modified polling interval. In some embodiments, an access point may respond to a polling alignment request with another polling grant frame, thereby resetting the polling interval. Further, an access point may transmit a polling grant frame at any time to modify the polling interval.

In some embodiments, a mobile station may receive a plurality of polling grants, and may keep track of polling schedules granted in the plurality of polling grants. For example, multiple mobiles stations in a wireless network may request polling by sending polling request frames to an access point. The access points may grant virtual polling by sending polling schedules in polling frames to each of the requesting mobile stations. In some embodiments, the mobile station may avoid collisions with other stations by honoring the virtual polling schedules of the other stations.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method performed by a mobile station in a wireless network, the method comprising:
   sending a polling request to request contention-free polling;
   receiving a polling grant that includes a first polling interval;
   receiving a plurality of polling frames separated in time by the first polling interval;
   monitoring a buffering delay and sending a polling alignment request to reduce the polling interval to reduce the buffering delay; and
   after the buffering delay is reduced, sending a second polling alignment request to restore the first polling interval.

2. The method of claim 1 wherein sending the polling alignment request comprises including the polling alignment request in a data frame.

3. The method of claim 1 wherein sending the polling alignment request comprises including the polling alignment request in an acknowledgement frame.

4. The method of claim 1 wherein sending the polling alignment request comprises sending a request to decrease a time until a next polling frame.

5. The method of claim 1 wherein sending the second polling alignment request comprises sending a request to increase a time until a next polling frame.

6. The method of claim 1 wherein sending the polling alignment request comprises including a polling alignment request in a quality of service (QoS) field of a data frame.

7. The method of claim 6 wherein sending the polling alignment request comprises including polling alignment information in bits 8-15 of the QoS field.

8. The method of claim 1 wherein the plurality of polling frames are compatible with an IEEE 802.11 standard.

9. An apparatus having a machine-readable medium with instructions stored thereon that when accessed, result in a machine performing:
   sending a polling request to request contention-free polling;
   receiving a polling grant that includes a first polling interval;
   receiving a plurality of polling frames separated in time by the first polling interval;
   monitoring a buffering delay and sending a polling alignment request to reduce the polling interval to reduce the buffering delay; and
   after the buffering delay is reduced, sending a second polling alignment request to restore the first polling interval.

10. The apparatus of claim 9 wherein sending the polling alignment request comprises sending a request to decrease a time until a next polling frame.

11. The apparatus of claim 9 wherein sending the second polling alignment request comprises sending a request to increase a time until a next polling frame.

* * * * *